E. B. MEYROWITZ.
EYEGLASSES.
APPLICATION FILED JAN. 23, 1908.
946,973.
Patented Jan. 18, 1910.
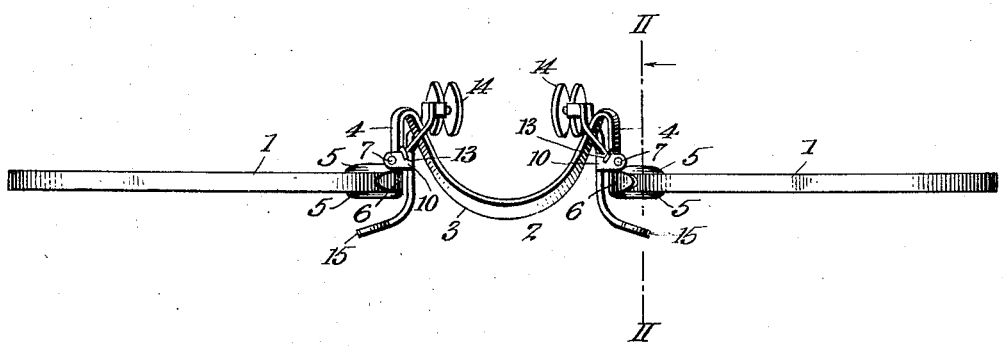
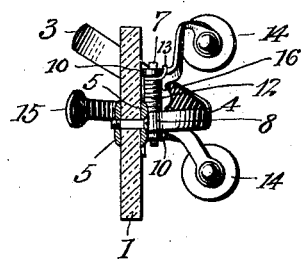
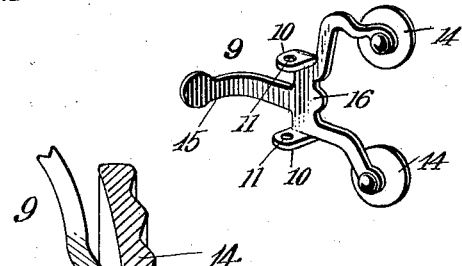
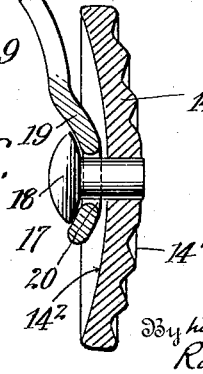
Witnesses:
Inventor
Emil B. Meyrowitz
By his Attorneys
Rosenbaum & Stockbridge

UNITED STATES PATENT OFFICE.

EMIL B. MEYROWITZ, OF NEW YORK, N. Y., ASSIGNOR TO THE MEYROWITZ MANUFACTURING CO., A CORPORATION OF NEW JERSEY.

EYEGLASSES.

946,973. Specification of Letters Patent. Patented Jan. 18, 1910.

Application filed January 23, 1908. Serial No. 412,251.

*To all whom it may concern:*

Be it known that I, EMIL B. MEYROWITZ, a citizen of the United States, residing at New York city, in the county of New York and State of New York, have invented certain new and useful Improvements in Eyeglasses, of which the following is a full, clear, and exact description.

This invention relates to eye-glasses of that type which has separately pivoted nose-guards each independently spring-impelled to exert a yielding clamping pressure on the nose. This device known as the Finch eye-glass guard, is unsightly, since the pivotal posts and springs of the nose guard members are conspicuous and clumsy. A disadvantage also arises from the fact that as the guards are pinched apart or swung open by manipulation of the thumb and finger of the wearer, care is required to prevent the pinching movement being carried so far that the grip of the fingers is lost and the glasses are ejected outward from between the fingers, which results in annoyance and possibly breakage.

It is the purpose of my present invention to provide a stop to limit the pinching movement of the nose guards so that the glasses cannot be freed from the fingers by the pinching pressure.

A further object of the invention is to improve and simplify the appearance of this type of eyeglasses.

I also provide an improved form of guard and nose engaging pad.

With these and other objects in view, my invention consists in the features of construction and combination as hereinafter set forth and claimed.

In the drawings: Figure 1 is a top or plan view of a pair of glasses embodying the principles of my invention. Fig. 2 is a section on the line II—II of Fig. 1 looking in the direction of the arrow. Fig. 3 is a detail view of part of the bridge together with the clip for the attachment of a lens. Fig. 4 is a perspective view showing the movable nose-guard. Fig. 5 is a face view of one of the nose engaging pads. Fig. 6 is an enlarged sectional view of the same.

Referring to the drawings in which like parts are designated by the same reference sign, 1 indicates the lenses and 2 the bridge of a pair of glasses. The bridge may be of any desired form having a central bowed portion 3 terminating in end portions 4 which are sharply bent around or reversed so as to extend directly forward in nearly parallel directions. At their foremost extremities these ends 4 of the bridge carry clips 5 and wings 6 which engage and support the lenses. These features thus far described are of substantially the ordinary construction, and in themselves form no part of the present invention.

I provide what I may term posts 7 forming hinges for the nose-guard members. In accordance with the present invention, these posts or hinges are located directly behind the wings 6, the parts 4 being thickened and drilled at this point as shown at 8 in Fig. 3. Each post or pivot pin 7 is tightly fixed in the hole 8 so as to stand vertically. While this particular construction of bridge for the above purpose is not absolutely essential, I regard it as particularly advantageous in practice in order to secure the important function indicated, namely, the positioning of the post or pin 7 directly behind the wings 6, and preferably extending slightly behind the lenses 1 so as to be hidden from view in front and thus give a simplified appearance to the mechanism.

The nose guard members 9 are preferably stamped integrally of sheet metal, as clearly shown in Fig. 4.

10 denote ears integral with the nose guard members and bent over laterally therefrom, so as to lie in parallel and spaced apart relation corresponding to the end portions of the pin or post 7.

11 designate holes in alinement with one another and which receive the pin 7 and constitute a hinge in conjunction therewith.

12 designates the usual spiral spring surrounding the post between the ears 10 and having one end 13 bent over the upper ear 10 (see Fig. 1). The other end of each spiral spring is received in the cavity between the clip 5 and the corresponding lens.

14 indicate pads of any suitable or desired construction, and forming part of the nose-guard members. The tension and arrangement of the spring and parts is such that the pads 14 are resiliently impelled toward one another with a steady even elastic force under all conditions.

Integrally formed with the nose-guard members 9 and extending forwardly therefrom, I employ lever extensions 15 which normally lie widely separated from one another in the manner shown in Fig. 1 under the influence of the springs 12. In this relation, the tips of these levers 15 are adapted to be grasped between the thumb and forefinger of one hand and pinched or compressed toward one another, thereby separating the pads 14 of the nose guards. In this movement, I provide a limiting stop so that the approach of the levers 15 cannot be carried to an extent where there is a tendency to eject the glasses outward from between the fingers. As shown in Fig. 4, there is provided a wall 16 formed by the projecting edge of the nose-guard member between the pads 14 and closely adjacent to the post 7. The wall 16 is adapted to engage the bent-over ends or extremities 4 of the bridge 2, thereby definitely limiting the separation of the nose-guard pads, and the approach of the lever arms 15. It is evident that the location of the edge or wall 16 may be varied as desired, thereby fixing the above-mentioned limits of motion at any required amounts. It is also within my invention to provide these stops in other ways so long as their function is obtained.

A feature of the invention lies in the construction and manner of support of the pads 14, by which certain special advantages are attained. Referring to Fig. 6, it will be seen that each pad 14 is made of meniscus or saucer-shape with an outside convex face $14'$, and an inside or concave face $14^2$. The fastening of the guard 9 is made on the inside or concave face of the pad by means of a universal joint 17. A preferred form of joint for this purpose comprises a rivet 18, which projects rigidly from the concave face of the pad 14. 19 designates an enlarged extremity of the nose guard 9 at the point of attachment of the pad thereon. This enlarged extremity is made dished or saucer-shaped in a manner somewhat corresponding to the pads 14. 20 designates a hole with rounded edges through the enlarged extremity 19, and which receives the rivet 18. The head of the rivet is somewhat rounded on its inside face to correspond with the concave form of the part 19. The parts being assembled as shown, with the convex face of the guard extremity 19 engaging and supporting the concave face $14^2$ of the pad, it is evident that a sort of universal or ball and socket engagement is provided, which permits quite a wide latitude of movement of the pad in adjusting itself upon the nose. This type of pad is capable of adjusting itself automatically into engagement with the nose by a sort of rolling movement which takes place partly by virtue of the form of the pad and partly by the universal joint by which it is supported. The glasses therefore adjust themselves more or less automatically to the nose without the usual careful manipulation.

The convex or nose-engaging face $14'$ of the pad is specially formed, as shown in Fig. 5. In place of the rectilinear ribbings usually employed, I provide concentric circular ribbings 27, in a continuous series extending from the center to the circumference of the pad, and in coaxial relation therewith. As the pad frictionally engages the nose to prevent displacement in any direction, these concentric circular ribs are particularly advantageous, since portions thereof are always presented squarely across every possible direction in which a force of displacement may be exerted. The pad is therefor adapted to resist displacement with an equal and maximum efficiency in every direction.

What I claim, is:—

1. In a pair of eyeglasses, a bridge having terminal portions turned or bent sharply forward in generally parallel directions, clips at the extremities of said terminal portions for the attachment of lenses, vertical posts on said terminal portions directly behind said clips when viewed from the front of the glasses, nose guards hinged to said posts, and spring means for impelling said nose guards together, each of said nose guards having a wall or edge 16 integral therewith and movable into engagement with said bent terminal portions of the bridge when said nose guards are separated a predetermined distance.

2. In eyeglasses, a nose guard having an enlarged dished extremity, a saucer-shaped pad fitting thereagainst, and slidably movable in contacting engagement therewith and a rivet fixed to said pad and passing through said dished extremity and having a rounded head engaging the concave face thereof.

3. In eyeglasses, a nose guard having a pad provided with a convex nose-engaging surface, said surface having concentric circular ribs in a continuous series from its center to its circumference, whereby an identical contour to resist displacement in any direction is produced.

In testimony whereof, I subscribe my signature, in the presence of two witnesses.

EMIL B. MEYROWITZ.

Witnesses:
C. G. BAKER,
R. B. HAMILTON.